(12) United States Patent
Kleifges

(10) Patent No.: US 6,666,314 B2
(45) Date of Patent: Dec. 23, 2003

(54) THRUST PLATE ASSEMBLY FOR A FRICTION CLUTCH

(75) Inventor: Jürgen Kleifges, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 10/028,577

(22) Filed: Dec. 20, 2001

(65) Prior Publication Data

US 2002/0079185 A1 Jun. 27, 2002

(30) Foreign Application Priority Data

Dec. 23, 2000 (DE) .......................... 100 64 964

(51) Int. Cl.[7] ............................................. F16D 13/50
(52) U.S. Cl. ............................... 192/70.18; 192/109 R; 192/109 A
(58) Field of Search ..................... 192/70.18, 70.27, 192/70.28, 109 R, 109 A

(56) References Cited

U.S. PATENT DOCUMENTS

| | | | | |
|---|---|---|---|---|
| 4,579,207 A | * | 4/1986 | Uenohara et al. | 192/70.18 |
| 4,635,775 A | * | 1/1987 | Kohler | 192/70.18 |
| 4,750,600 A | * | 6/1988 | Adachi | 192/70.18 |
| 4,809,834 A | * | 3/1989 | Channing | 192/70.27 |
| 4,863,004 A | * | 9/1989 | Kummer et al. | 192/70.18 |
| 5,584,372 A | * | 12/1996 | Eichelsbacher et al. | 192/70.18 |
| 6,206,158 B1 | * | 3/2001 | Muller et al. | 192/30 W |
| 6,360,862 B1 | * | 3/2002 | Szadkowski et al. | 192/70.18 |

FOREIGN PATENT DOCUMENTS

| | | | |
|---|---|---|---|
| DE | 3422019 A1 | * | 12/1985 |
| DE | 198 48 582 | | 4/2000 |
| GB | 2079875 A | * | 1/1982 |

* cited by examiner

Primary Examiner—Saul Rodriquez
(74) Attorney, Agent, or Firm—Cohen, Pontani, Lieberman & Pavane

(57) ABSTRACT

A pressure plate is held so as to be movable axially with respect to the housing by means of at least one leaf spring arrangement which is secured in a first coupling area to a first mounting area of the pressure plate and is secured in a second coupling area to a second mounting area of the housing. A contact surface is provided on each mounting area for the contact of the at least one leaf spring arrangement with the first coupling area and the second coupling area. The contact surface in at least one of the mounting areas is inclined relative to a plane (E) extending essentially orthogonal to an axis of rotation (A) of the thrust plate.

10 Claims, 3 Drawing Sheets

THRUST PLATE ASSEMBLY FOR A FRICTION CLUTCH

BACKGROUND OF THE INVENTION

1. Field of the Invention

The present invention is directed to a thrust plate assembly for a friction clutch including a housing having an axis of rotation and a pressure plate which is movable axially with respect to the housing by means of at least one leaf spring arrangement. The at least one leaf spring arrangement is secured in a first coupling area to a first mounting area of the pressure plate and is secured in a second coupling area to a second mounting area of the housing. A contact surface is provided respectively in the first mounting area and in the second mounting area at the pressure plate and housing for the contact of the at least one leaf spring arrangement with the first coupling area and the second coupling area.

2. Description of the Related Art

A thrust plate assembly of the type mentioned above is known, for example, from DE 198 48 582 and its basic construction will be described in the following with reference to FIG. 1.

This thrust plate assembly 10 shown in FIG. 1 has a housing 12, which is constructed at one axially open side for connecting to a flywheel or the like. A pressure plate 14 is provided in the housing 12 and, as will be described in the following, is arranged so as to be essentially fixed with respect to rotation relative to the housing 12, but so as to be displaceable in direction of an axis of rotation A. For this purpose, a plurality of leaf spring arrangements 16 are provided, each of which can have one leaf spring element, for example. The leaf spring arrangements 16 are securely connected by their end areas to the pressure plate 14 and housing 12, respectively, by rivet pins 24, 28 or the like. For this purpose, the pressure plate 14 has mounting portions 20 which project radially outward and at which the leaf spring arrangements 16 are secured to first coupling areas 11 by the rivet pins 24, or the like, mentioned above. The housing 12 has two mounting portions 18 formed by bending or shaping arranged so as to be offset in circumferential direction relative to the first mounting portions 20, the respective leaf spring units 16 being secured with the second coupling areas 26 by means of the rivet pins 28 or the like at these second mounting portions 18.

Due to the fact that the pressure plates 14 in thrust plate assemblies of the type mentioned above are generally offset in direction of the axis of rotation A with their first mounting portions 20 with respect to the second mounting portions 18 of the housing arrangement, the leaf spring arrangements and leaf spring elements thereof extend between the two mounting portions 18, 20 so as to be curved in axial direction. Particularly in friction clutches with a self-energizing or self-reinforcing engaging effect, this curvature is used to generate an additional force component pressing against a clutch disk during transmission of torque, a relatively sharp bend being required in the leaf spring arrangements 16 for this purpose. However, this results in a comparatively strong loading of the leaf spring arrangements particularly in their curved areas so that fatigue of the leaf spring arrangements results relatively quickly in these areas.

SUMMARY OF THE INVENTION

It is the object of the present invention to further develop a thrust plate assembly of the type mentioned above in such a way that the leaf spring arrangement or arrangements thereof is or are protected against excessive loading.

According to the invention, the contact surface in the first mounting area and/or the contact surface in the second mounting area are/is inclined relative to a plane extending essentially orthogonal to an axis of rotation of the thrust plate.

By providing the inclined contact surfaces which can be directly contacted by the leaf spring arrangements at the pressure plate and, as the case may be, at the housing, the leaf spring arrangements are already inclined in a direction in which they are also inclined in the final installation position. Nevertheless, a deflection of the leaf spring arrangements from their installed position results in the leaf spring arrangement generating a releasing force which draws the pressure plate back into the housing. The present invention provides a simple step by which overloading of the leaf spring arrangements is substantially prevented.

Preferably, it can be provided in the present invention that the contact surface is inclined along a line connecting the first mounting area and the second mounting area. In order to keep the loading of the leaf spring arrangements as slight as possible, the first mounting area and the second mounting area are offset relative to one another in the direction of an axis of rotation of the thrust plate, and the contact surface in the first mounting area and/or the contact surface in the second mounting area are/is inclined in such a way that the leaf spring arrangement contacting the latter extends substantially in a straight line toward the other mounting area in an essentially relaxed state of the leaf spring arrangement. In order to achieve a suitable support with the at least one leaf spring arrangement from both sides, particularly in the area of arrangement at the pressure plate, it is suggested that a correspondingly inclined counter-contact surface of a support element is located opposite the inclined contact surface in the first mounting area with the intermediary of the first coupling area of the at least one leaf spring arrangement. In this respect, it can further be provided that the pressure plate and the support element are oriented with respect to their surface regions remote of the contact surface and counter-contact surface, respectively, so as to be essentially parallel to the plane. By means of this step, it can be ensured that a rivet pin connecting the leaf spring arrangement to the pressure plate can be guided through an opening extending essentially in axial direction. It is not necessary to introduce any pin openings which are inclined in some way.

Additional protection against overloading of the leaf spring arrangement, especially during compression loading, can be achieved by means of apparatus for limiting relative rotational movement between the pressure plate and the housing such that the first mounting area and the second mounting area approach one another circumferentially. This rotational movement limiting apparatus can be achieved in a particularly simple manner with at least one shaped area which is preferably formed integral with the housing. In this case, the rotational movement limiting apparatus preferably forms a movement stop for at least one support element.

According to a further aspect, the present invention is directed to a thrust plate assembly for a friction clutch comprising a housing and a pressure plate which is held so as to be movable axially with respect to the housing by means of at least one leaf spring arrangement, wherein the at least one leaf spring arrangement is secured in a first coupling area to a first mounting area of the pressure plate and is secured in a second coupling area to a second mounting area of the housing arrangement. A contact surface is provided respectively in the first mounting area and in the second mounting area at the pressure plate and housing for the contact of the at least one leaf spring arrangement with the first coupling area and the second coupling area. This thrust plate assembly is characterized by apparatus for limiting the rotational movement of the pressure plate with respect to the housing such that the first mounting area and second mounting area approach one another circumferentially, wherein the rotational movement limiting apparatus provided at the housing and forms a movement stop for the pressure plate in the area of at least a first mounting area.

Excessive loading of the at least one leaf spring arrangement leading to compression deformation of the same is also prevented by providing a rotational movement stop of the type mentioned above which acts directly between the housing and the pressure plate.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
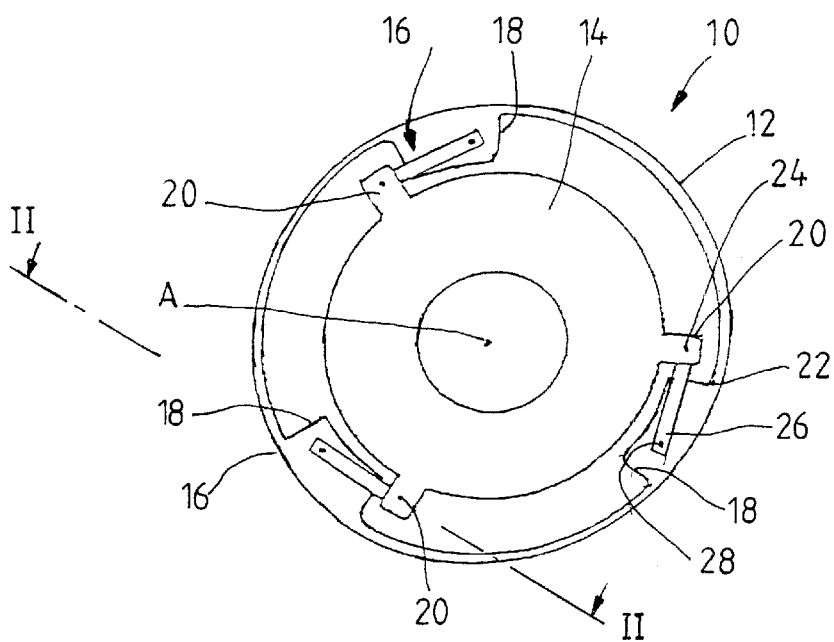
FIG. 1 shows an axial view of a thrust plate assembly considered from the axially open end of a housing arrangement.
Figure 2:
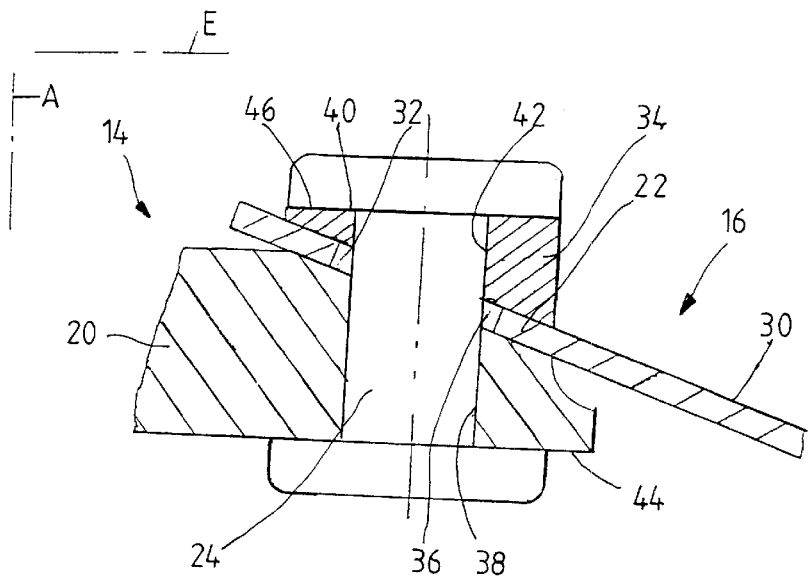
FIG. 2 shows a partial sectional view along a line II—II in FIG. 1 which shows the connection of a leaf spring arrangement to a pressure plate.

FIG. 2 shows one of the arm-like mounting portions 20 of the pressure plate 14 which project out radially. At its side facing the interior of this housing, this first mounting portion 20 has a first contact surface 32 extending at an inclination, wherein this contact surface 32 is inclined relative to a plane E which, in the view in FIG. 2, is orthogonal to the drawing plane and axis of rotation A of the thrust plate assembly. Further, the contact surface 32 is inclined in circumferential direction so that the leaf spring 30 of a leaf spring arrangement 16 contacting the contact surface 32 by its first coupling area 22 extends, proceeding from this mounting area 20, substantially tangential to a circle concentric to the axis of rotation A and, therefore, is also inclined in the manner shown in FIG. 2.

A support element 34 which is constructed in a wedge-shaped manner is positioned opposite the first contact surface 32 of the of the first mounting portion 20 and has a counter-contact surface 36 which is inclined in a manner corresponding to the inclination of the contact surface 32. The leaf spring 30 is accordingly clamped between the contact surface 32 and counter-contact surface 36 of the support element 34 by its first coupling area 22 in a flat manner without point overload. The mounting portion 20, the leaf spring 30 and the support element 34 each have through-openings 38, 40, 42 through which the rivet pin 24 is inserted. In this regard, it will be seen that the backs 44, 46 of the mounting portion 20 and support element 34 facing away from one another extend essentially parallel to one another and also essentially parallel to the plane E. The rivet pin 24 and the through-openings 38, 42 provided for the latter in the mounting portion 20 and support element 34 accordingly extend approximately parallel to the axis of rotation A.

By arranging a leaf spring 30 at the pressure plate 14 in the manner shown in FIG. 2, it is ensured that the leaf spring 30 already fundamentally occupies an inclined position and can accordingly contribute to the above-mentioned self-reinforcing effect without having to be sharply curved. By providing the inclined contact surface region 32 directly at the pressure plate 14 or at an mounting portion 20 provided integral therewith, a construction is achieved which is comparatively simple to produce or which can already be formed in this way during the casting of the pressure plate 14 and in which, ultimately, the support element 34 is the only additional structural component part, compared with a conventional installation position of the support element 34 without inclination.

Figure 3:
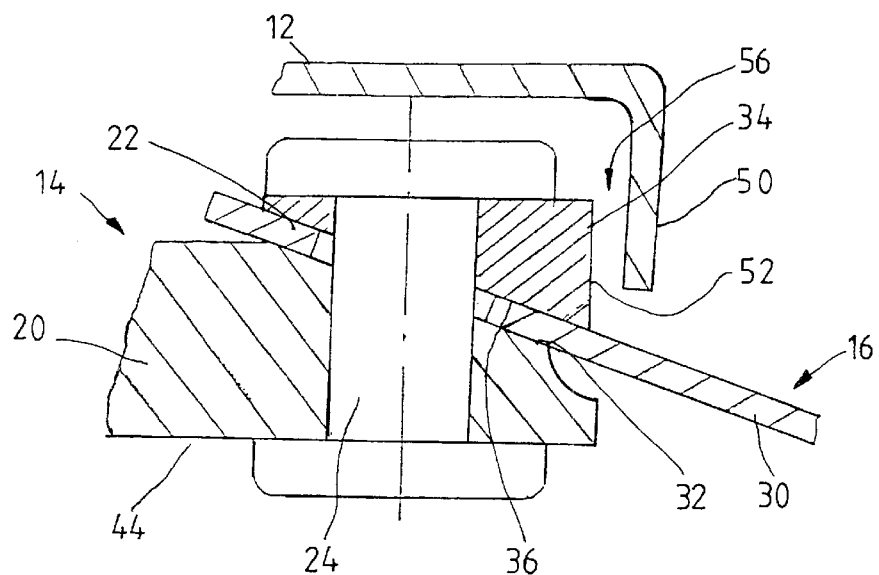
FIG. 3 shows a view, corresponding to FIG. 2, of an alternative embodiment form.

In the embodiment form shown in FIG. 3, in addition to the arrangement of the leaf spring 30 at the pressure plate 14 in the manner described already with reference to FIG. 2, a rotational movement stop is provided for the pressure plate 14 with respect to the housing arrangement 12. It will be seen that the housing 12 has a bent axial portion 50 in an area following the mounting portion 20 in circumferential direction, which bent axial portion 50 extends axially to the region of the mounting portion 20 and to a surface 52 of the support element 34 in circumferential direction. Further, it will be seen that the portion 50 of the housing 12 is positioned at that side of the mounting portion 20 at which the leaf spring 30 also extends away from the latter. When the leaf spring 30 is compression-loaded, i.e., during relative rotation of the pressure plate 14 with respect to the housing 12 such that the mounting portions 18, 20 assigned to a leaf spring 30 approach one another, the support element 34 contacts the portion 50 of the housing 12 by its surface 52 so that a further rotation of the pressure plate 14 relative to the housing 12 and accordingly a continued compression and deformation of the leaf spring 30 can not occur.

Figure 4:
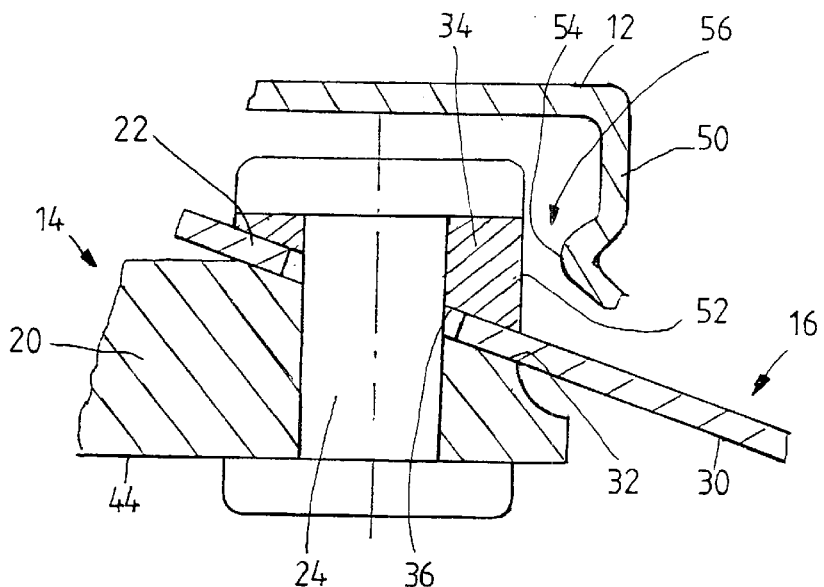
FIG. 4 shows another view, corresponding to FIG. 2, of an alternative embodiment form.

In the construction variant shown in FIG. 4, the axial end region of the portion 50 of the housing 12 is initially curved toward the surface 52 of the support element 34 and then curves away from this surface 52 again to form a cap-like contact region 54. In this way, point overloading can be prevented when this rotational movement limiting arrangement 56 takes effect.

Figure 5:
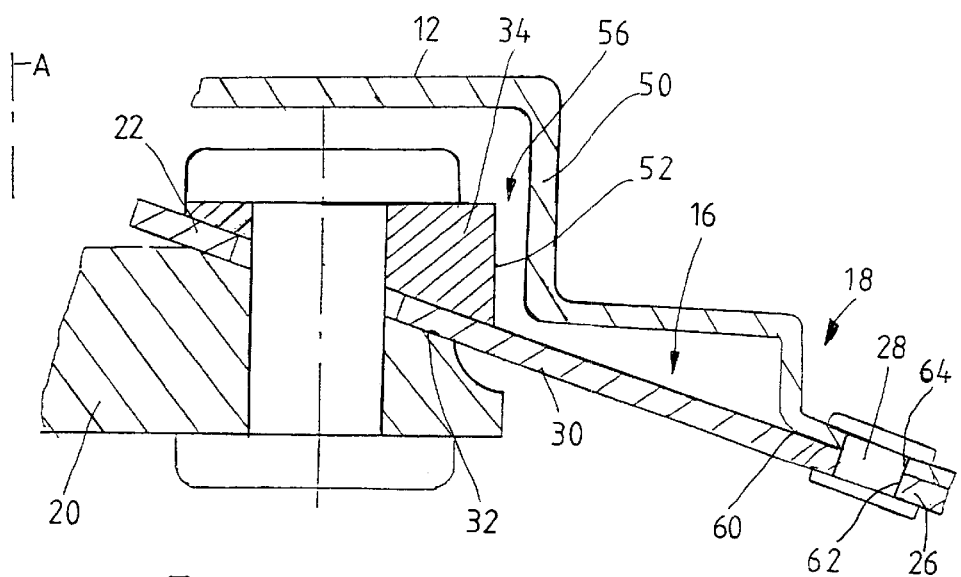
FIG. 5 shows another view, corresponding to FIG. 2, of an alternative embodiment form.

FIG. 5 shows an embodiment form in which an inclined contact surface 60 for the second coupling area 26 of the leaf spring 30 is also provided in the mounting portion 18 of the housing 12. The inclination of the second contact surface 60 can substantially correspond to the inclination of the contact surface 32 at the first mounting portion 20, so that the leaf spring 30 essentially extends in a straight line without curving between the two coupling areas 22 and 26 in a basic installation position.

In the second coupling area 26, the leaf spring 30 is coupled by means of the rivet pin 28 to the housing 12 and the second mounting portion 20 formed by shaping. For this purpose, a through-opening 62, 64 is provided in the leaf spring 30 and in the second mounting portion 18 in the housing. It will be seen that the central axis of these two through-openings 62, 64 are inclined relative to the axis of rotation A, which leads to a correspondingly inclined installation position of the rivet pin 28. In order to facilitate the production process, the through-opening 64 can be formed particularly in the housing 12 already before the latter is shaped, that is, for example, during the process for producing a sheet metal blank of this housing, so that the through-opening 64 already has the installation position shown in FIG. 5 after the shaping process. Further, when shaping the sheet metal blank for the housing 12 to form the second mounting portions 18, the portion 50 which, together with the surface 52 of the support element 34, essentially forms the rotational movement limiting apparatus 56 is also produced at the same time by a step-like construction.

If the inclined construction in the area of the second mounting portion 18 is not possible in the embodiment form according to FIG. 5, an inclined installation position of the leaf spring 30 with its second coupling area 26 could also be achieved by arranging two support elements 34 opposite one another, the second coupling area 26 of the leaf spring 30 being received therebetween. In principle, however, the leaf spring 30 could also be installed without inclination. Further, it is possible, of course, to install in the area of the first coupling area 22 without inclination, i.e., so as to be substantially parallel to plane E, and then to carry out an inclined installation in the area of the housing mounting 12 as is shown in FIG. 5.

In all of the embodiment forms of the present invention, however, the inclined installation which is provided in at least one coupling area of a leaf spring is achieved by means of a correspondingly inclined contact surface directly at the housing mounting or pressure plate without it being absolutely necessary to interpose a structural component part providing a corresponding inclination. This reduces the number of required structural component parts and facilitates the process of assembly.

Although only one leaf spring arrangement 16 was mentioned in the preceding with reference to FIGS. 2 to 5, it is self-evident that when a plurality of leaf spring arrangements of this kind are provided in a thrust plate assembly all of these leaf spring arrangements can be constructed in the manner shown in the drawings.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A thrust plate assembly for a friction clutch, said thrust plate assembly comprising a pressure plate having a first mounting area with a first contact surface, a housing having an axis of rotation and a second mounting area with a second contact surface, and a leaf spring arrangement which holds said pressure plate so as to be movable axially with respect to said housing, said leaf spring arrangement having a first coupling area secured to said first contact surface and a second coupling area secured to said second contact surface, wherein at least one of said first and second contact surfaces is inclined on a straight line at an acute angle relative to a plane which is orthogonal to said axis of rotation said straight line connecting said first and second mounting areas.

2. A thrust plate assembly as in claim 1 wherein said leaf spring arrangement is secured to said at least one of said first and second contact areas by a rivet.

3. A thrust plate assembly as in claim 1 wherein said first and second mounting areas are axially offset relative to one another, said at least one of said first and second contact surfaces being inclined so that said leaf spring arrangement, in a relaxed state, extends in a substantially straight line between said first and second contact areas without any curvature adjacent to said at least one of said first and second contact areas.

4. A thrust plate assembly as in claim 1 wherein said first contact surface is inclined at an acute angle relative to a plane which is orthogonal to said axis of rotation, said assembly further comprising a support element located opposite from said first contact surface, said first coupling area lying between said first contact surface and said support element.

5. A thrust plate assembly as in claim 4 wherein each of said pressure plate and said support element has a respective surface facing away from said first coupling area, each said surface facing away from said first coupling area being essentially orthogonal to said axis.

6. A thrust plate assembly as claimed in claim 1 further comprising means for limiting relative rotational movement between said pressure plate and said housing such that the first mounting area and the second mounting area approach one another circumferentially.

7. A thrust plate assembly as in claim 6, wherein said means for limiting relative rotational movement between said pressure plate and said housing comprises a formed area which is integral with said housing.

8. A thrust plate assembly as in claim 4 further comprising means for limiting relative rotational movement between said pressure plate and said housing such that the first mounting area and the second mounting area approach one another circumferentially, said means comprising a movement stop on the housing adjacent to the support element.

9. A thrust plate assembly as in claim 4 further comprising a rivet passing through said support element, said first coupling area, and said first mounting area to secure said first coupling area between said first contact area and said support element.

10. A thrust plate assembly for a friction clutch, said thrust plate assembly comprising a pressure plate having a first mounting area with a first contact surface, a housing having an axis of rotation and a second mounting area with a second contact surface, at least one leaf spring arrangement which holds said pressure plate so as to be movable axially with respect to said housing, said leaf spring arrangement having a first coupling area secured to said first contact surface and a second coupling area secured to said second contact surface, and means for limiting relative rotational movement between said pressure plate and said housing such that the first mounting area and the second mounting area approach one another circumferentially, said means comprising a movement stop on the housing adjacent to the first mounting area, said movement stop being arranged so that said leaf spring abuts against said movement stop as said first and second mounting areas approach one another circumferentially.

* * * * *